United States Patent
Chen et al.

(10) Patent No.: US 9,551,857 B2
(45) Date of Patent: Jan. 24, 2017

(54) WIDE ANGLE LENS ASSEMBLY

(71) Applicant: Google Inc., Mountain View, CA (US)

(72) Inventors: Xi Chen, San Jose, CA (US); Xiaoyu Miao, Palo Alto, CA (US); Lu Gao, San Jose, CA (US)

(73) Assignee: Google Inc., Mountain View, CA (US)

( * ) Notice: Subject to any disclaimer, the term of this patent is extended or adjusted under 35 U.S.C. 154(b) by 522 days.

(21) Appl. No.: 14/037,201

(22) Filed: Sep. 25, 2013

(65) Prior Publication Data

US 2015/0085135 A1   Mar. 26, 2015

(51) Int. Cl.
| | |
|---|---|
| G02B 9/62 | (2006.01) |
| H04N 5/225 | (2006.01) |
| G02B 13/00 | (2006.01) |
| G02B 13/06 | (2006.01) |
| G02B 13/18 | (2006.01) |

(52) U.S. Cl.
CPC ............ G02B 9/62 (2013.01); G02B 13/0045 (2013.01); H04N 5/2254 (2013.01); H04N 5/2257 (2013.01)

(58) Field of Classification Search
CPC ..... G02B 13/0045; G02B 13/06; G02B 13/18; G02B 13/008; G02B 9/62
See application file for complete search history.

(56) References Cited

U.S. PATENT DOCUMENTS

| | | | |
|---|---|---|---|
| RE35,310 E | 8/1996 | Moskovich | |
| 6,804,066 B1 | 10/2004 | Ha et al. | |
| 7,649,693 B2 | 1/2010 | Kuroda et al. | |
| 7,663,814 B2 | 2/2010 | Kitahara | |
| 8,395,852 B2 | 3/2013 | Tsai et al. | |
| 8,441,746 B2 | 5/2013 | Hsieh et al. | |
| 8,456,758 B1 | 6/2013 | Huang et al. | |
| 8,456,763 B2 | 6/2013 | Hsieh et al. | |
| 8,462,449 B2 | 6/2013 | Hsu et al. | |
| 8,508,865 B2 | 8/2013 | Teraoka | |
| 2008/0291531 A1* | 11/2008 | Heimer | G02B 7/002 359/351 |
| 2012/0243108 A1* | 9/2012 | Tsai | G02B 13/18 359/713 |
| 2014/0029115 A1* | 1/2014 | Liao | G02B 13/06 359/713 |
| 2014/0043695 A1* | 2/2014 | Hsu | G02B 13/0045 359/713 |

* cited by examiner

*Primary Examiner* — Obafemi Sosanya
(74) *Attorney, Agent, or Firm* — Blakely Sokoloff Taylor & Zafman LLP

(57) ABSTRACT

A camera system includes an image sensor, a stop aperture, an infrared cut filter disposed between the image sensor and the stop aperture, and a lens assembly. The lens assembly has a field of view ranging between 80 degrees and 110 degrees and is disposed between the infrared cut filter on an image side of the lens assembly and the stop aperture on an object side of the lens assembly. The lens assembly includes six lenses. Four of the six lenses have positive optical power and two of the six lenses have negative optical power. The six lenses include first, second, third, fourth, fifth, and sixth lenses having first inline, second inline, third inline, fourth inline, fifth inline, and sixth inline relative positions, respectively, along an optical path through the lens assembly.

18 Claims, 8 Drawing Sheets

| Surface # | | Radius of Curvature (mm) | Thickness (mm) | Material | Refractive Index at 587.6nm | Abbe # | Focal Length (mm) |
|---|---|---|---|---|---|---|---|
| | EfL = 2.795mm, Fno =2.4, HFOV = 45deg. | | | | | | |
| S0 | object | Plano | Infinity | air | | | |
| S1 | Aperture Stop | Plano | -0.07 | air | | | |
| S2 | Lens1 (L1) | 1.987 | 0.200 | plastics | 1.63 | 23.3 | 120.11 |
| S3 | | 1.960 | 0.066 | air | | | |
| S4 | Lens2 (L2) | 1.630 | 0.335 | plastics | 1.53 | 55.8 | 4.26 |
| S5 | | 5.382 | 0.099 | air | | | |
| S6 | Lens3 (L3) | -23.234 | 0.200 | plastics | 1.64 | 23.0 | -9.74 |
| S7 | | 8.653 | 0.085 | air | | | |
| S8 | Lens4 (L4) | 1.567 | 0.247 | plastics | 1.54 | 55.9 | 20.62 |
| S9 | | 1.719 | 0.234 | air | | | |
| S10 | Lens5 (L5) | -3.627 | 0.650 | plastics | 1.53 | 55.0 | 2.23 |
| S11 | | -0.958 | 0.317 | air | | | |
| S12 | Lens 6 (L6) | 7.547 | 0.650 | plastics | 1.63 | 23.3 | -2.65 |
| S13 | | 1.336 | 0.22 | air | | | |
| S14 | IRCF | Plano | 0.25 | glass | 1.517 | 64 | infinity |
| S15 | | Plano | | air | | | |
| S16 | Image Plane | Plano | | | | | |

FIG. 7A

| Surface # | | Conic Constant | A4 | A6 | A8 | A10 | A12 | A14 | A16 |
|---|---|---|---|---|---|---|---|---|---|
| | | Aspheric Coefficients | | | | | | | |
| 2 | Lens1 (L1) | -25.753 | 0.192 | -0.270 | -0.316 | -0.036 | 1.725 | -1.892 | -3.191 |
| 3 | | -32.239 | -0.027 | -0.064 | -0.077 | -0.128 | -3.184 | -1.231 | 7.557 |
| 4 | Lens2 (L2) | -14.910 | -0.080 | 0.462 | -0.448 | -1.241 | 1.422 | 3.234 | -13.912 |
| 5 | | 45.086 | -0.319 | -0.297 | 0.079 | 0.970 | -1.499 | -2.817 | 0.060 |
| 6 | Lens3 (L3) | 408.772 | -0.020 | -0.891 | 0.018 | 0.058 | 0.880 | 0.443 | -1.160 |
| 7 | | 83.603 | 0.024 | -0.175 | -0.105 | -0.138 | -0.515 | 2.522 | -1.785 |
| 8 | Lens4 (L4) | -9.683 | -0.189 | -0.060 | 0.196 | -0.023 | -0.943 | 0.895 | -0.106 |
| 9 | | -4.727 | -0.189 | 0.034 | 5.210e-3 | 5.640e-3 | -0.114 | 0.022 | 4.406e-3 |
| 10 | Lens5 (L5) | 9.366 | 0.013 | 0.070 | -0.022 | 0.108 | -0.131 | -0.111 | 0.119 |
| 11 | | -0.665 | -0.017 | 0.018 | 0.022 | 0.021 | 8.648e-3 | -0.035 | 0.021 |
| 12 | Lens6 (L6) | | -0.267 | 0.143 | -0.072 | 0.029 | 1.999e-3 | -0.011 | 2.615e-3 |
| 13 | | | -0.103 | 0.023 | 7.312e-5 | -1.608e-3 | 1.729e-4 | 2.544e-5 | -3.993e-6 |

FIG. 7B

WIDE ANGLE LENS ASSEMBLY

TECHNICAL FIELD

This disclosure relates generally to the field of optics, and in particular but not exclusively, relates to lens assemblies.

BACKGROUND INFORMATION

Conventional digital imaging devices or cameras often include a lens assembly (which includes multiple lens elements) that focuses image light onto an image sensor that measures the image light and generates an image based on the measurements. FIG. 1 illustrates a common configuration for a digital imaging device 100, which includes an image sensor 110 and a lens assembly 115 including multiple lens elements 120. Lens assembly 115 is disposed over image sensor 110 to focus image light 125 from an object onto the pixels of image sensor 110. Lens assembly 115 may include convex and/or concave lens elements 120 that together give lens assembly 115 an effective focal length ("EFL"). The lens assembly 115 also provides a certain Depth of Field ("DOF"). DOF refers to the range of distances in the field of view of an image sensor that appear to be well focused in an image captured by image sensor 110. The Field of View ("FOV") of lens assembly 115 refers to the angular extent that is viewable through lens assembly 115 at a given moment.

Lens assembly 115 has a z-axis height H1, which is also referred to as the optical total track length ("TTL"). The optical TTL is typically influenced by the FOV and the size of image sensor 110, as well as other design choices. A larger optical TTL may limit the applications or uses of digital imaging device 100 because of space constraints. Therefore, a lens assembly that allows a digital imaging device to capture high resolution images with a large FOV while reducing the optical TTL can be advantageous.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIGS. 7A & 7B are tables that provide design parameters for implementing a demonstrative lens assembly having a large FOV and compact optical TTL, in accordance with an embodiment of the disclosure.

DETAILED DESCRIPTION

Embodiments of a system and apparatus for a lens assembly that provides a large FOV and short optical total track length ("TTL") are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A compact camera module having a FOV ranging between 80 to 110 degrees (and in particular between 88 and 100 degrees) is well suited for wearable computing applications, such as head wearable displays. Head wearable displays are becoming portable computing devices that need to be light and compact and include cameras with a large FOV and high resolution. In contrast, cell phone cameras typically have a FOV in the 64 to 75 degree range and don't have as tight form factor constraints. Other conventional lens assemblies, such as fish eye lenses, are designed to have very wide fields of view, typically above 120 degrees.

Figure 1:
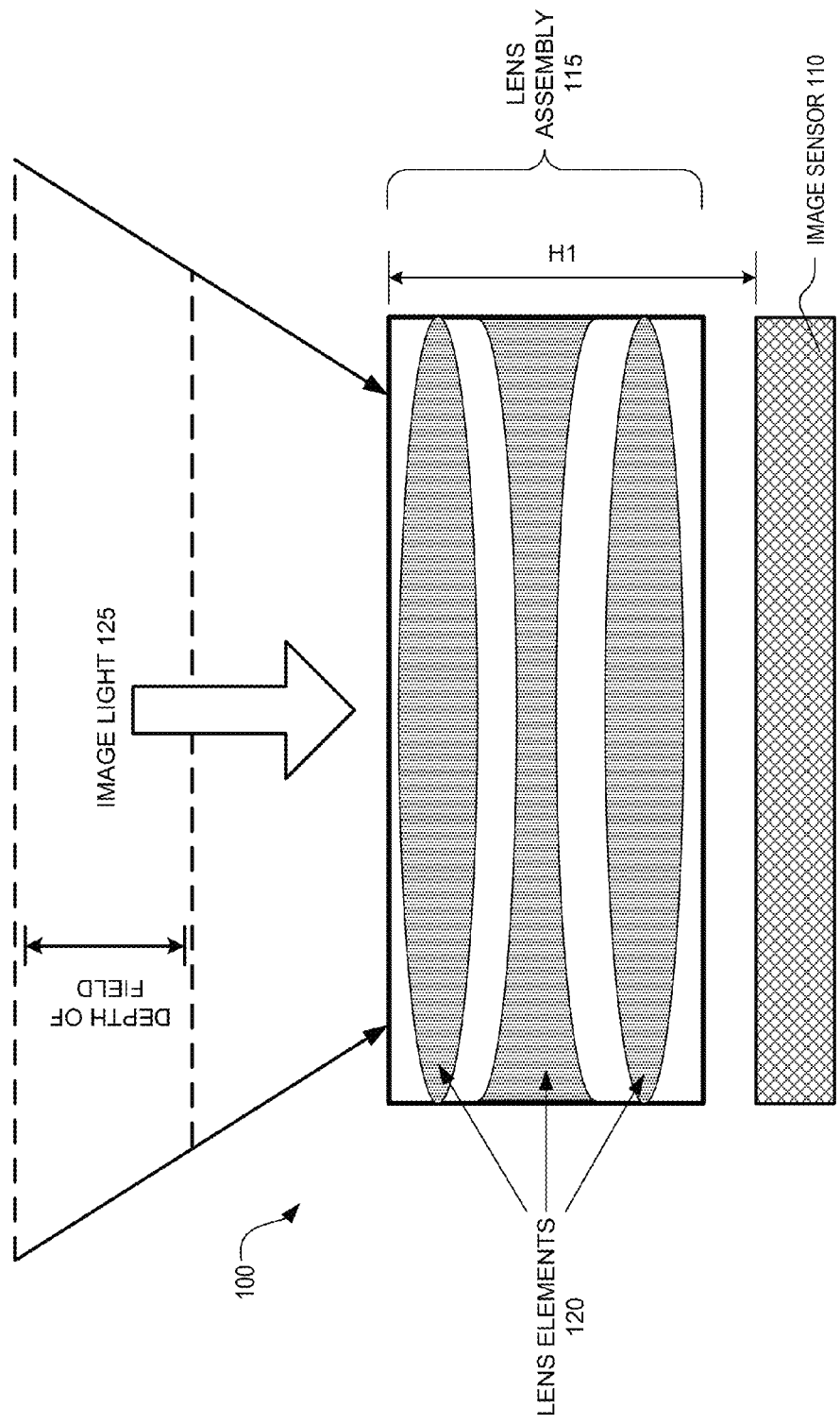
FIG. 1 (Prior Art) illustrates a conventional lens assembly for a camera module.
Figure 2:
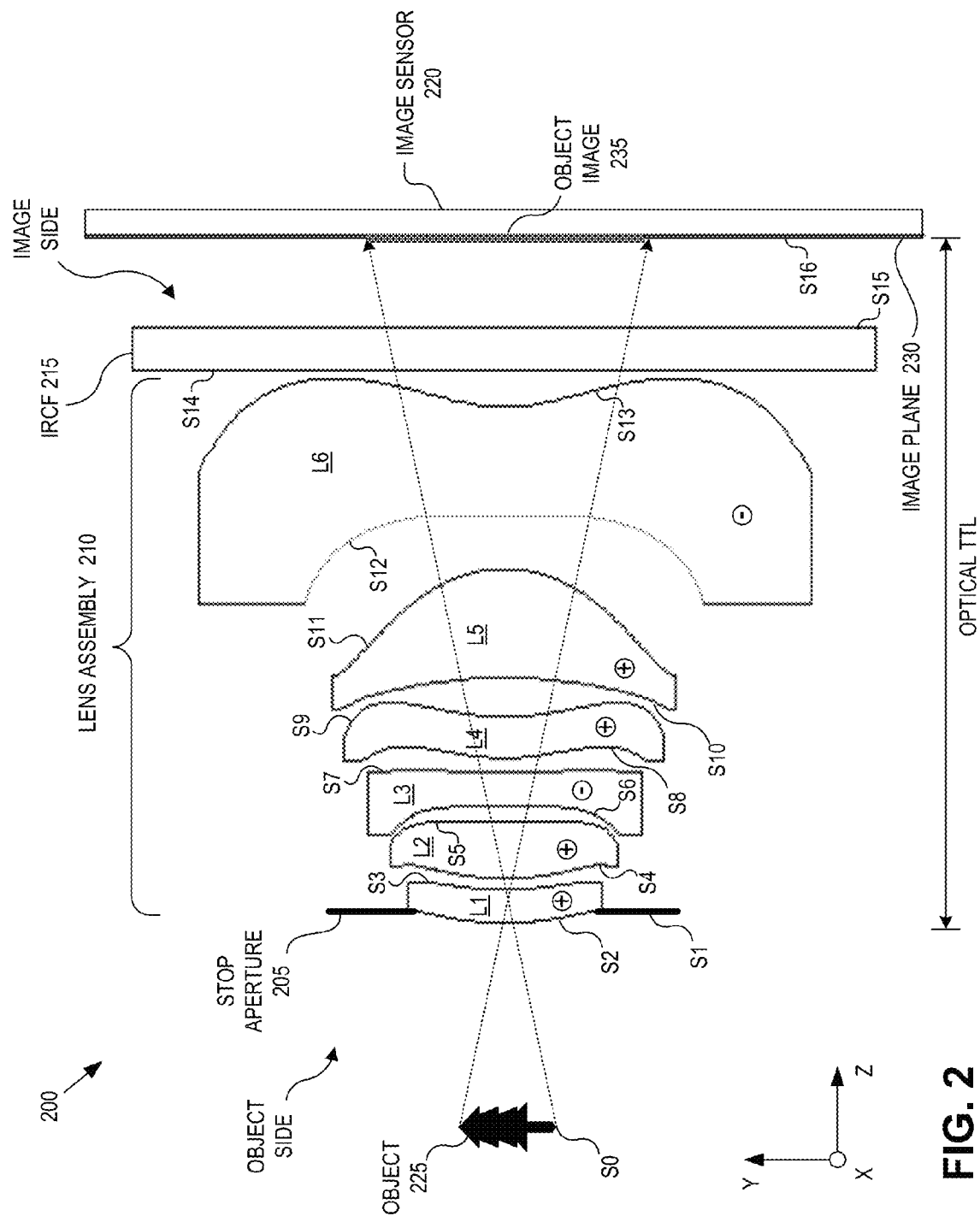
FIG. 2 is a cross-sectional view illustrating a camera module having a lens assembly that provides a large field of view ("FOV") with reduced optical total track length ("TTL"), in accordance with an embodiment of the disclosure.
Figure 3:
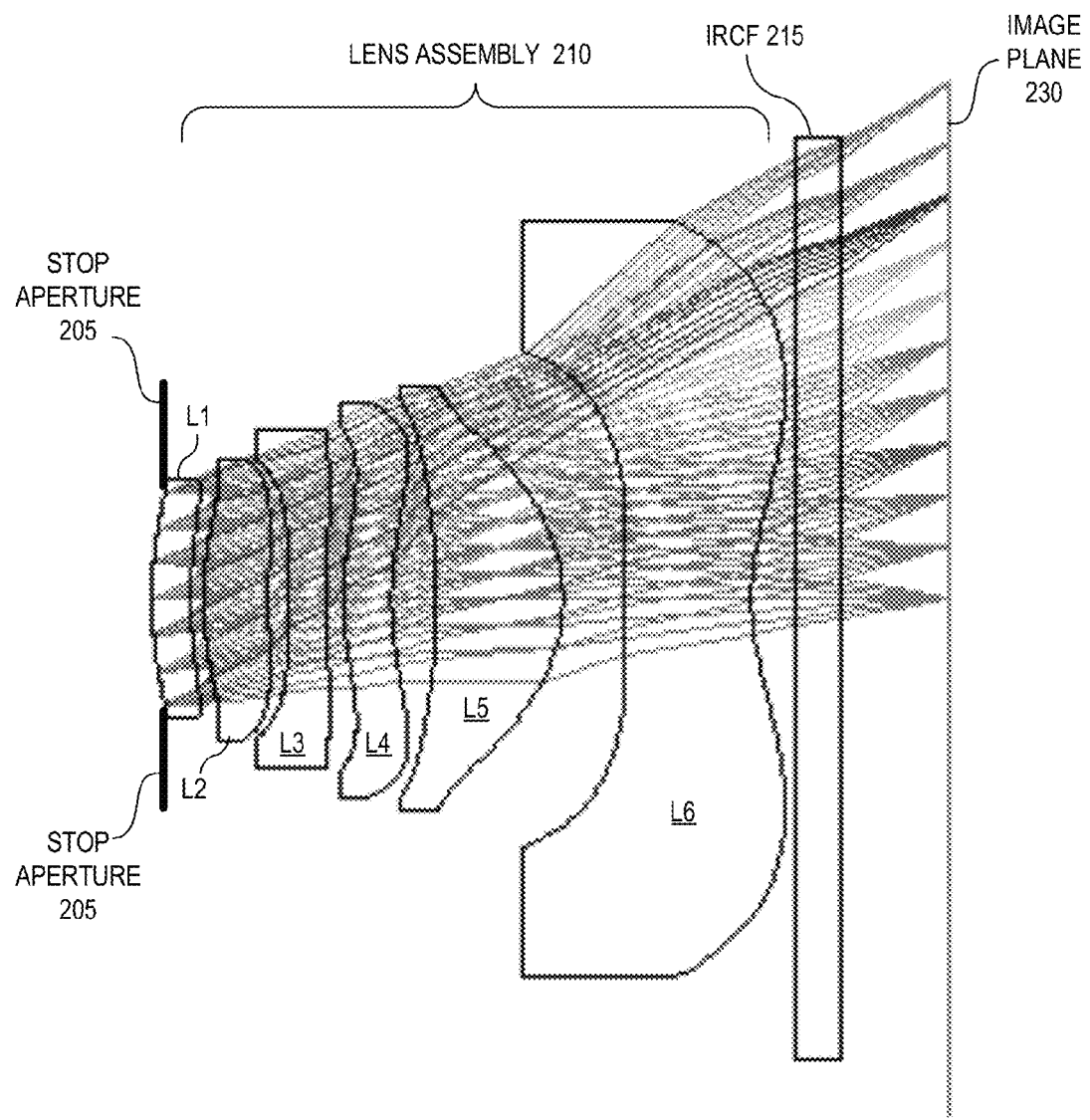
FIG. 3 is a cross-sectional view illustrating light ray bundles passing through the lens assembly, in accordance with an embodiment of the disclosure.

FIGS. 2 and 3 are cross-sectional views illustrating a camera module 200 having a lens assembly that provides a large field of view ("FOV") with a compact optical TTL, in accordance with an embodiment of the disclosure. FIG. 2 provides an unobstructed cross-sectional view of camera module 200 while FIG. 3 illustrates light ray bundles passing through the lens assembly. The illustrated embodiment of camera module 200 includes a stop aperture 205, a lens assembly 210, an infrared cut filter ("IRCF") 215, and an image sensor 220. The illustrated embodiment of lens assembly 210 has six total lenses including: a lens L1 having surfaces S2 and S3, a lens L2 having surfaces S4 and S5, a lens L3 having surfaces S6 and S7, a lens L4 having surfaces S8 and S9, a lens L5 having surfaces S10 and S11, and a lens L6 having surfaces S12 and S13. The object 225 corresponds to surface S0, stop aperture 205 corresponds to surface S1, and IRCF 215 includes surfaces S14 and S15. The light incident side surface S16 of image sensor 220 is positioned at image plane 230 to capture object image 235.

Lens assembly 210 provides camera module 200 with a large FOV in a compact form factor along the z-axis (the axis running parallel to the depth of field) while achieving good optical characteristics (e.g., reduced optical distortion, well controlled field curvatures along tangential and sagittal directions, well controlled lateral color, etc.). Various embodiments of lens assembly 210 may range between 80 degrees and 110 degrees for the FOV. In one embodiment, camera module 200 has a diagonal FOV of 90 degrees with an optical TTL of 4.105 mm for image sensor 220 having a full image circle size of 5.6 mm, and stop aperture 205 providing an F-number of 2.4. In this embodiment, IRCF 215 is implemented as a blue glass IRCF having a thickness of 0.25 mm. Of course, camera module 200 may be implemented with its constituent components having other dimensions. For example, the F-number may typically vary between 2.0 to 2.4 for use in a head wearable display, though greater variances may be implemented. Furthermore, when implementing camera module 200 for use in a head wearable display, it may be designed to have a depth of field that ranges from 50 cm to infinity.

Returning to FIG. 2, lens assembly 210 includes a total of six discrete lenses L1 to L6 with stop aperture 205 positioned in front of (i.e., on the object side of) the first lens L1 in the optical train. In other words, lens assembly 201 does not include any surfaces with optical power on the object side of stop aperture 205.

In the illustrated embodiment, lens L1 has positive optical power, lens L2 has positive optical power, lens L3 has negative optical power, lens L4 has positive optical power, lens L5 has positive optical power, and lens L6 has negative optical power. Thus, lens assembly 210 includes six total lenses with four lenses having varying degrees of positive optical power and two lenses having varying degrees of negative optical power. Thus the total optical power of lens assembly 210 is distributed across the six lenses L1 to L6. The illustrated embodiments of lens L1 to L6 are discrete elements within intervening air gaps. These discrete lenses can be fabricated of a variety of materials (e.g., plastic, glass, etc.). In one embodiment, lens L1 to L6 are fabricated of injection molded plastics for high volume manufacturing.

Lens L1 is the first inline lens in the optical train and is weakly positive, but contributes to the total positive optical power. In one embodiment, lens L1 has the weakest positive optical power of all the lenses with positive optical power (i.e., weaker than lens L2, L4, and L5). Lens L1 operates to reduce the large ray angle of the upper marginal ray for large off-axis field heights. This reduction of ray angle helps to reduce optical aberration for the upper marginal rays for the large off-axis field heights. Furthermore, the weak positive power of lens L1 makes this lens less sensitive to manufacturing variances. Due to its low optical power, lens L1 can have a low Abbe number without contributing too much dispersion (color aberration). The Abbe number is a measure of a transparent material's dispersion in relation to its index of refraction. In one embodiment, lens L1 is made of a material having the lowest Abbe number of the lenses with positive optical power.

Lens L2 is the second inline lens in the optical train and is strongly positive, therefore contributing to the total positive optical power. Due to its strong optical power, lens L2 is designed to have a high Abbe number to reduce its contribution to axial color aberration (dispersion).

Lens L3 is the third inline lens in the optical train and has negative optical power. The negative optical power of lens L3 reduces the field curvature of lens assembly 210. Lens L3 may also be made of a material having low Abbe number to offset axial color aberration induced by the positive power lenses thereby reducing the overall axial color aberration of lens assembly 210.

Lens L4 is the fourth inline lens in the optical train and has positive optical power, contributing to the overall positive optical power.

Lens L5 is the fifth inline lens in the optical train and has positive optical power, contributing to the overall positive optical power. Lens L5 is strongly positive. In one embodiment, lens L5 has the strongest positive optical power (i.e., shortest focal length of the positive lenses). Due to its strong positive optical power, lens L5 is made of a material having a high Abbe number to reduce its contribution to axial color aberration.

Lens L6 is the sixth inline lens in the optical train and has negative optical power. In the illustrated embodiment, lens L6 is the largest lens in lens assembly 210. Lens L6 has an inflection point in the curvature of surface S13 and no inflection point in the curvature of surface S12. Lens L6 operates as a field corrector. The rays from different field heights fall on different regions of lens L6, which servers to correct field curvature, control optical distortion, and control the chief ray angle in the image space. For some implementations of image sensor 220 (e.g., CMOS image sensors), the chief ray angle in the image space should be kept below 32 degrees to maintain desirable quantum efficiency and low cross-talk. To achieve this, the chief ray angle for large field heights should be constrained. Lens L6 serves as a field correct or to maintain reasonable chief ray angles.

In the illustrated embodiment, lens L6 is the largest lens and larger than lens L5. The diameter of lens L6 is sufficiently large while the diameter of lens L5 sufficiently small, relative to lens L6, such that the convex shape of surface S11 extends into a recess formed by the concave surface S12 of lens L6. This design feature contributes to the overall compactness of the optical TTL.

In illustrated embodiment, lens L1, L2, L4, and L5 have positive optical power while lenses L3 and L6 have negative optical power. In order to reduce overall color aberration of lens assembly 210, the two lens having negative optical power (lens L3 and L6) are designed to induce negative color dispersion to offset the positive color dispersion induced by the four lens having positive optical power (L1, L2, L4, and L5). With only two negative lenses to offset the dispersion of four positive lenses, in one embodiment, lens L3 and L6 have Abbe numbers that are equal to or less than that of any of the lenses with positive power (L1, L2, L4, and L5).

IRCF 215 may be implemented using a variety of different types of filters to cut out the infrared spectrum. For example, IRCF 215 may be implemented as a pigmented or absorptive color filter (e.g., blue glass filter) or an interference filter. However, given that an interference filter operates by reflecting the IR wavelengths back into lens assembly 210, these reflections may again bounce back towards image sensor 220 due to the refractive index interfaces at each lens surface. Accordingly, absorptive type IRCF may be more effective at removing infrared wavelengths. These wavelengths are removed, since they are not visible to the human eye, but may be picked up by image sensor 220. In one embodiment, IRCF 215 is a blue glass infrared cut filter having a thickness of 0.25 mm.

Image sensor 220 is positioned such that its light sensitive surface S16 is coincident with the image plane 230 of lens assembly 210. Image sensor 220 may be implemented using a variety of technologies including charged coupled devices ("CCD") sensors or complementary metal-oxide-semiconductor ("CMOS") sensors. In one embodiment, image sensor 220 is a 1/3.2" 5 megapixel CMOS sensor.

FIGS. 7A & 7B are tables that provide design parameters for implementing an example lens assembly according to the design guidelines set forth above. The table illustrated in FIG. 7A summarizes the radius of curvature, thickness, material type, refractive index, Abbe number, and focal length of each surface S0-S16 (illustrated in FIG. 2) for one demonstrative implementation of camera module 200. Similarly, the table illustrated in FIG. 7B sets forth the conic constant (k) and aspheric coefficients describing the shape of each surface S2 through S13 illustrated in FIG. 2. The coefficients A4 through A16 represent the coefficients in the first seven series elements in the aspheric surface equation, $$z(r) \frac{cr^2}{1+\sqrt{1-(1+k)c^2r^2}} + A_4 r^4 + A_6 r^6 + A_8 r^8 + A_{10} r^{10} + A_{12} r^{12} + A_{14} r^{14} + A_{16} r^{16},$$

where c represents the radius of curvature (1/radius), k represents the conic constant, and r represents the radius of the lens.

Figure 4:
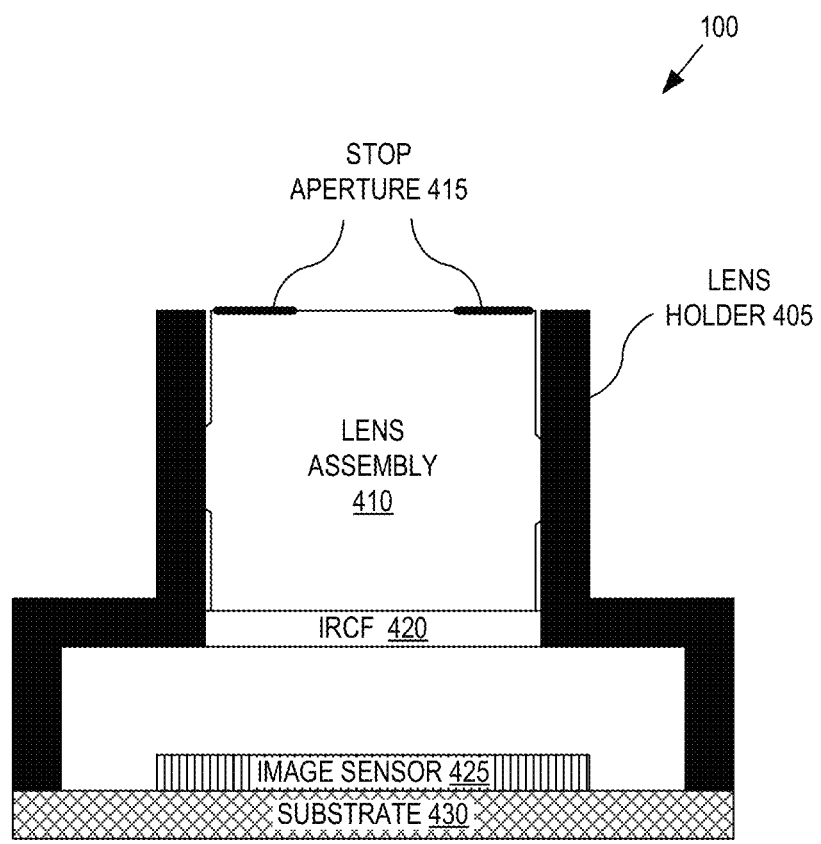
FIG. 4 is a cross-sectional view illustrating a camera module including a barrel style lens assembly, in accordance with an embodiment of the disclosure.

FIG. 4 is a cross-sectional view illustrating a camera module 400 including a barrel style lens assembly, in accordance with an embodiment of the disclosure. The illustrated embodiment of camera module 400 includes a lens holder 405, a lens assembly 410, a stop aperture 415, an IRCF 420, an image sensor 425, and a substrate 430. Camera module 400 represents one possible form factor for implementing camera module 200 illustrated in FIGS. 2 and 3. Correspondingly, lens assembly 410 is an example implementation of lens assembly 210, while stop aperture 415, IRCF 420, and image sensor 425 correspond to implementations of stop aperture 205, IRCF 215, and image sensor 220, respectively.

Lens assembly 410 packages the discrete lens elements (L1 through L6) into a barrel style form factor, which threads into lens holder 405. In one embodiment, lens assembly 410 includes male threads around its perimeter, which mate to female threads on the inside edge of lens holder 405. This thread design facilitates offset adjustment to align the image plane 230 of lens assembly 410 with the light sensitive side S16 of image sensor 425. Lens holder 405 also serves to seal image sensor 425 on top of substrate 430 and prevent dust or other contaminants for accumulating on image sensor 425. It should be appreciated that lens assembly 210 may be implemented in other form factors than the barrel style illustrated in FIG. 4.

Figure 5:
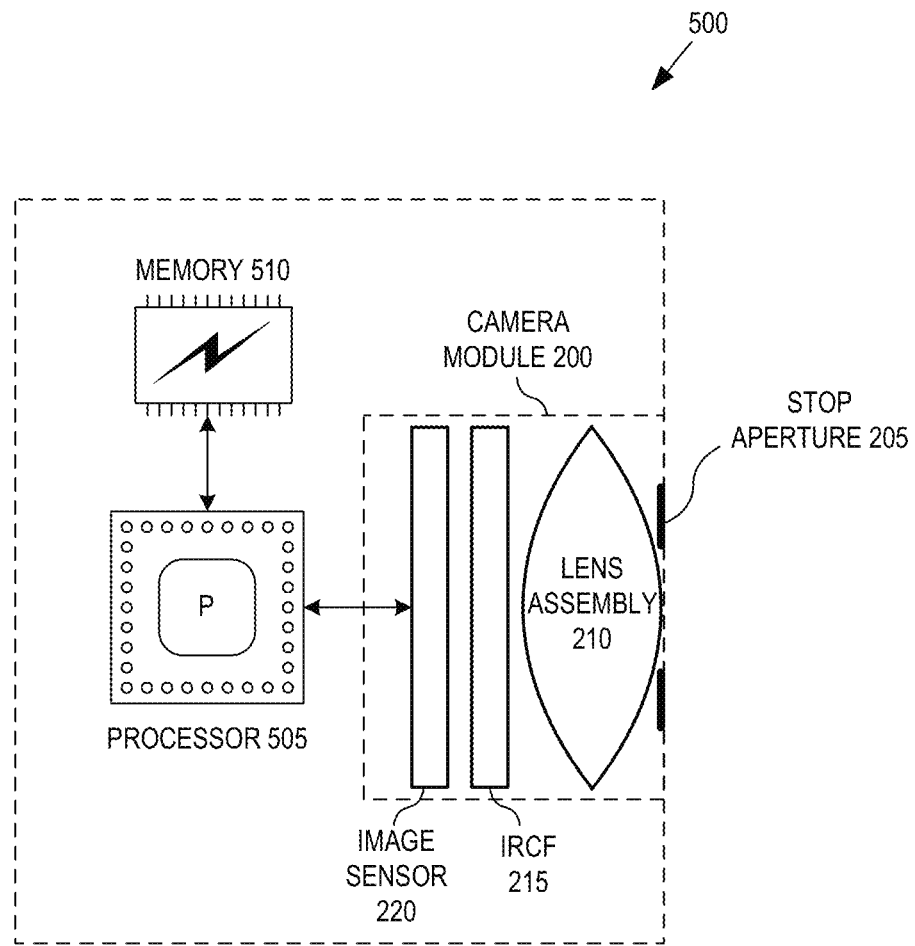
FIG. 5 is a functional block diagram illustrating a camera system, in accordance with an embodiment of the disclosure.

FIG. 5 is a functional block diagram illustrating a camera system 500, in accordance with an embodiment of the disclosure. The illustrated embodiment of camera system 500 includes camera module 200, a processor 505, and memory 510. Camera system 500 is well suited for integration within an head wearable display, but may also be used in various other products including smart phones, tablets, laptops, televisions, watches, etc. Camera module 200 provides a high resolution camera having a wide FOV in a compact z-axis form factor. During operation, processor 505 may perform a number of post imaging functions including cropping, compression, image analysis, etc. using instructions stored in memory 510. The acquired images may further be stored into memory 510, which may be implemented using volatile memory (DRAM, SRAM, etc.) or non-volatile memory (e.g., flash memory, etc.).

Figure 6:
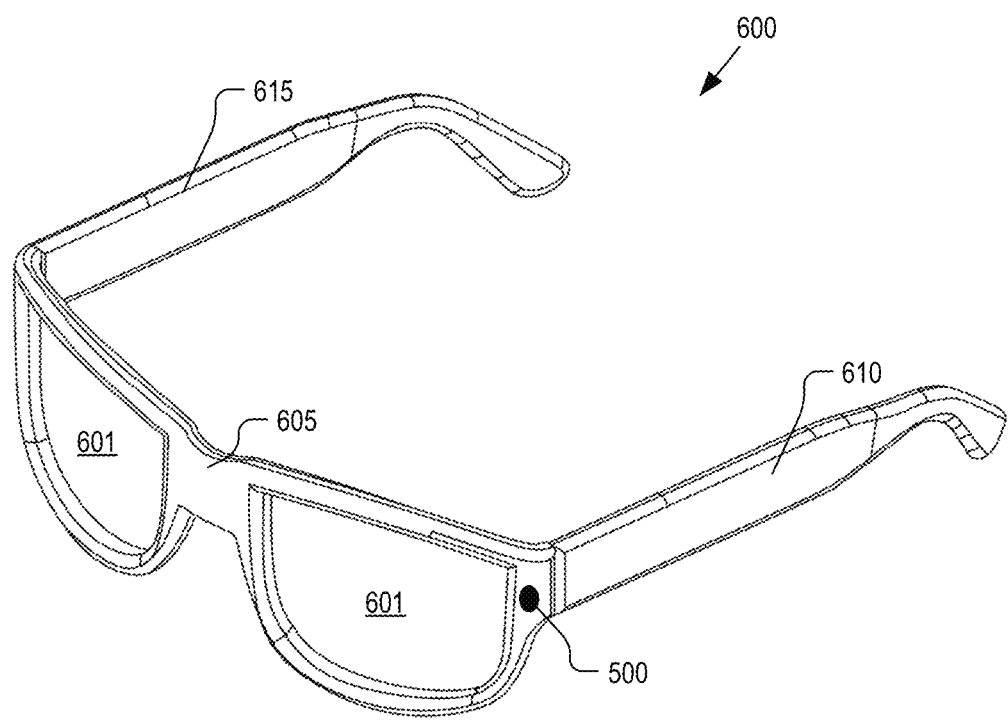
FIG. 6 is a perspective view illustrating a head wearable display that includes a camera system, in accordance with an embodiment of the disclosure.

FIG. 6 is a perspective view illustrating a binocular head wearable display 600 that may include a camera system 500, in accordance with an embodiment of the disclosure. The illustrated embodiment of binocular head wearable display 600 includes two see-through displays 601 that may present each eye of the user with a computer generated image ("CGI") superimposed over there vision of the external world. Camera system 500 may be used to capture images of the external world, which are then processed by processor 505 to generate CGI that is context sensitive to the user's environment.

The see-through displays 601 are mounted to a frame assembly, which includes a nose bridge 605, left ear arm 610, and right ear arm 615. Camera system 500 may be disposed in any of portion of the frame assembly with a forward facing perspective. In other embodiments, camera module 500 may be a rear facing camera positioned to capture eye images for eye tracking functionality, in addition to, or in place of, a forward facing camera. Although FIG. 6 illustrates a binocular embodiment, display 600 may also be implemented as a monocular display.

The see-through displays 601 are secured into an eye glass arrangement or head wearable display that can be worn on the head of a user. The left and right ear arms 610 and 615 rest over the user's ears while nose bridge 605 rests over the user's nose. The frame assembly is shaped and sized to position each display in front of a corresponding eye of the user. Other frame assemblies having other shapes may be used (e.g., a visor with ear arms and a nose bridge support, a single contiguous headset member, a headband, goggles type eyewear, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A camera apparatus, comprising:
   an image sensor;
   a stop aperture;
   an infrared cut filter disposed between the image sensor and the stop aperture; and
   a lens assembly having a field of view ranging between 80 degrees and 110 degrees disposed between the infrared cut filter on an image side of the lens assembly and the stop aperture on an object side of the lens assembly, the lens assembly including six lenses, wherein four of the six lenses have positive optical power and two of the six lenses have negative optical power, wherein the six lenses include first, second, third, fourth, fifth, and sixth lenses having first inline, second inline, third inline, fourth inline, fifth inline, and sixth inline relative positions, respectively, along an optical path through the lens assembly,
   wherein the first lens is disposed closest to the stop aperture and has positive optical power, and wherein the first lens has weaker positive optical power, and is made of a material having a lower Abbe number, than all others of the six lenses that have positive optical power.

2. The camera apparatus of claim 1, wherein the fifth lens has positive optical power and further has stronger optical power than any of the six lenses having positive optical power.

3. The camera apparatus of claim 2, wherein the first, second, fourth, and fifth lenses all have positive optical power while the third and sixth lenses have negative optical power.

4. The camera apparatus of claim 3, wherein the first lens, which has weaker positive optical power than the second, fourth, and fifth lenses, is made of a material having a lower Abbe number than that of the second, fourth, and fifth lenses.

5. The camera apparatus of claim 3, wherein both of the third and sixth lenses, which have negative optical power, are made of materials having Abbe numbers equal to or less than that of any of the first, second, fourth, or fifth lenses, which having positive optical power.

6. The camera apparatus of claim 1, wherein the lens assembly does not include any surfaces with optical power on the object side of the stop aperture.

7. The camera apparatus of claim 1, wherein the sixth lens is the only lens of the six lenses having an inflection point on its image side and no inflection point on its object side.

8. The camera apparatus of claim 7,
wherein the sixth lens has a concave surface on its object side,
wherein the fifth lens has a convex surface on its image side,
wherein the fifth lens has a smaller diameter than the sixth lens, and
wherein the convex surface of the fifth lens extends into a recess formed by the concave surface of the sixth lens.

9. The camera apparatus of claim 1, wherein the camera system is disposed within a head wearable display.

10. An optical apparatus for a camera, comprising:
a lens assembly having a field of view ranging between 80 degrees and 110 degrees, the lens assembly including:
a first lens having positive optical power;
a second lens having positive optical power;
a third lens having negative optical power;
a fourth lens having positive optical power;
a fifth lens having positive optical power; and
a sixth lens having negative optical power,
wherein the second lens is positioned between the first and third lenses, the third lens is positioned between the second and fourth lenses, the fourth lens is positioned between the fifth and third lens, and the fifth lens is positioned between the fourth and sixth lens,
wherein the first lens has weaker positive optical power than the second, fourth, and fifth lenses and the first lens is made of a material having a lower Abbe number than that of the second, fourth, and fifth lenses; and
a stop aperture disposed on an object side of the first lens.

11. The optical apparatus of claim 10, further comprising:
an image sensor; and
an infrared cut filter ("IRCF") disposed on an image side of the sixth lens between the sixth lens and the image sensor.

12. The optical apparatus of claim 10, wherein the lens assembly does not include any surfaces with optical power on the object side of the stop aperture.

13. The optical apparatus of claim 10, wherein the fifth lens has stronger positive optical power than the first, second, and fourth lenses.

14. The optical apparatus of claim 13, wherein the lens assembly includes six total lenses and only two of the six total lenses have negative optical power.

15. The optical apparatus of claim 14, wherein both of the third and sixth lenses, which have negative optical power, are made of materials having Abbe numbers equal to or less than that of any of the first, second, fourth, or fifth lenses, which having positive optical power.

16. The optical apparatus of claim 10, wherein the sixth lens is the only lens of the six total lenses having an inflection point on its image side and no inflection point on its object side.

17. The optical apparatus of claim 16,
wherein the sixth lens has a concave surface on its image side,
wherein the fifth lens has a convex surface on its image side,
wherein the fifth lens has a smaller diameter than the sixth lens, and
wherein the convex surface of the fifth lens extends into a recess formed by the concave surface of the sixth lens.

18. The optical apparatus of claim 10, wherein the first, second, third, fourth, fifth, and six lenses are discrete lenses made of plastic with air gaps disposed between each adjacent lens.

* * * * *